United States Patent
Kruglick

(10) Patent No.: US 9,356,956 B2
(45) Date of Patent: May 31, 2016

(54) PREVENTING NETWORK TOMOGRAPHY IN SOFTWARE DEFINED DATACENTER NETWORKS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 104 days.

(21) Appl. No.: 14/356,150

(22) PCT Filed: Jun. 6, 2013

(86) PCT No.: PCT/US2013/044614
§ 371 (c)(1),
(2) Date: May 3, 2014

(87) PCT Pub. No.: WO2014/196978
PCT Pub. Date: Dec. 11, 2014

(65) Prior Publication Data
US 2015/0319190 A1 Nov. 5, 2015

(51) Int. Cl.
H04L 29/06 (2006.01)
H04L 1/00 (2006.01)
H04L 12/28 (2006.01)
H04L 12/751 (2013.01)
H04L 12/721 (2013.01)

(52) U.S. Cl.
CPC ............. *H04L 63/1475* (2013.01); *H04L 1/00* (2013.01); *H04L 12/28* (2013.01); *H04L 45/02* (2013.01); *H04L 63/02* (2013.01); *H04L 45/38* (2013.01)

(58) Field of Classification Search
CPC ... G06F 9/45533; G06F 11/3006; G06F 8/60; G06F 9/45558; G06F 8/65; H04L 43/08; H04L 47/70
See application file for complete search history.

(56) References Cited

U.S. PATENT DOCUMENTS

| | | |
|---|---|---|
| 7,617,533 B1 | 11/2009 | Hernacki |
| 7,752,666 B2 | 7/2010 | Jayawardena et al. |
| 8,125,895 B2 | 2/2012 | Yasuie et al. |
| 8,230,504 B1 | 7/2012 | Jafari et al. |
| 8,442,030 B2 | 5/2013 | Dennison |

(Continued)

FOREIGN PATENT DOCUMENTS

WO 2004070509 A2 8/2004

OTHER PUBLICATIONS

Office Action received for U.S. Appl. No. 14/290,883, mailed Sep. 16, 2015 and filed May 29, 2014.

(Continued)

*Primary Examiner* — Amir Mehrmanesh
(74) *Attorney, Agent, or Firm* — Turk IP Law, LLC

(57) ABSTRACT

Technologies are provided for preventing abuse of software-defined datacenter networks. In some examples, an SDN abuse prevention module within a control layer of an SDN may use graph analysis rules and monitor network paths over time to detect and prevent abusive network conformation change command series. Instance-generated network paths may be analyzed to determine if the paths attempt to repeatedly traverse one or more sensitive network paths. If so, the paths may be implemented or denied based on, among other things, the time scale within which they attempt to repeatedly traverse the sensitive network paths.

16 Claims, 9 Drawing Sheets

(56) References Cited

U.S. PATENT DOCUMENTS

| | | | | |
|---|---|---|---|---|
| 2003/0086422 | A1* | 5/2003 | Klinker | H04L 29/06 370/389 |
| 2004/0196843 | A1 | 10/2004 | Zinin | |
| 2006/0195436 | A1* | 8/2006 | Levesque | G06F 8/71 |
| 2008/0162679 | A1 | 7/2008 | Maher et al. | |
| 2010/0061227 | A1 | 3/2010 | Sundt et al. | |
| 2011/0058545 | A1 | 3/2011 | Eriksson | |
| 2011/0116499 | A1 | 5/2011 | Lim et al. | |
| 2013/0046887 | A1* | 2/2013 | Malloy | H04L 41/145 709/224 |
| 2014/0007238 | A1 | 1/2014 | Magee et al. | |
| 2015/0135176 | A1* | 5/2015 | Kruglick | G06F 9/45533 718/1 |

OTHER PUBLICATIONS

"OpenFlow MythBusting by Google," accessed at http://www.bigswitch.com/blog/2012/04/30/openflow-mythbusting-by-google, accessed on Jan. 23, 2014, pp. 1-4.

"Software Defined Networking," accessed at http://web.archive.org/web/20130429174226/http://wnl.ku.edu.tr/sdn.html, accessed on Jan. 23, 2014, pp. 1-1.

"Startup Tackles OpenFlow Security," accessed at http://web.archive.org/web/20120920143116/http://www.lightreading.com/documentasp?doc_id=219752, Apr. 12, 2012, pp. 1-6.

"www.OpenFlowSec.org," accessed at http://web.archive.org/web/20120616024659/http://www.openflowsec.org/, accessed on Jan. 23, 2014, pp. 1-2.

Babcock, C., "With Rackspace Cloud, OpenStack Goes Primetime," accessed at http://web.archive.org/ web/20130324003144/http://www.informationweek.com/cloud-computing/infrastructure/with-rackspace-cloud-openstack-goes-prim/232900379, Apr. 17, 2012, pp. 1-6.

Benson, T., "Network Traffic Characteristics of Data Centers in the Wild," Proceedings of the 10th Annual Conference on Internet Measurement, pp. 267-280, ACM (2010).

Besag, J., "Spatial Interaction and the Statistical Analysis of Lattice Systems," Journal of the Royal Statistical Society. Series B (Methodological), vol. 36, No. 2, pp. 192-236 (1974).

Bort, J., "Oracle Just Declared War on Cisco ," accessed at http://web.archive.org/web/20120902014929/http://www.businessinsider.com/oracle-cisco-software-defined-networking-2012-7, Jul. 30, 2012, pp. 1-3.

Bu, T., et al., "Network Tomography on General Topologies," Proceedings of the 2002 ACM SIGMETRICS international conference on Measurement and modeling of computer systems, pp. 21-30 (2002).

Cáceres, R., et al., "Multicast-Based Inference of Network-Internal Loss Characteristics," IEEE Transaction on Information Theory, vol. 45, Issue 7, pp. 2462-2480 (1999).

Cao, J., et al., "A Scalable Method for Estimating Network Traffic Matrices from Link Counts," Technical Report, Bell Labs, pp. 1-9 (2000).

Cao, J., et al., "Time-varying network tomography: Router link data," Journal of the American Statistical Association, vol. 95, No. 452, pp. 1063-1075 (2000).

Castro, R., et al., "Network Tomography: Recent Developments," Statistical Science, vol. 19, No. 3, pp. 499-517, Institute of Mathematical Statistics (2004).

Denneman, F., "Storage DRS, more than I/O load-balancing only," accessed at http://web.archive.org/web/20120502080528/http://blogs.vmware.com/vsphere/2012/04/storage-drs-more-than-io-load-balancing-only.html, accessed on Jan. 24, 2014, pp. 1-2.

Ghita, D., et al., "Shifting Network Tomography Toward a Practical Goal," Proceedings of the Seventh COnference on emerging Networking EXperiments and Technologies, pp. 12, ACM (2011).

Jackson, J., "VMware to Acquire Openflow Pioneer Nicira for $1.26 Billion," accessed at http://www.cio.com/article/711787/VMware_to_Acquire_Openflow_Pioneer_Nicira_for_1.26_Billion, Jul. 23, 2012, pp. 1-4.

Kerner, S.M., "OpenFlow Can Provide Security, Too," accessed at http://web.archive.org/web/20121113112129/http://www.enterprisenetworkingplanet.com/datacenter/openflow-can-provide-security-too.html, May 14, 2012, pp. 1-2.

Kerner, S.M., "VMware Takes Aim at Software Defined Networking and OpenFlow," accessed at http://web.archive.org/web/20130605013513/http://www.internetnews.com/infra/vmware-takes-aim-at-software-defined-networking-and-openflow.html, May 14, 2012, pp. 1-1.

Levy, S., "Going With the Flow: Google's Secret Switch to the Next Wave of Networking," accessed at http://web.archive.org/web/20130604044336/http://www.wired.com/wiredenterprise/2012/04/going-with-the-flow-google/, Apr. 17, 2012, pp. 1-3.

McKeown, N., et al., "OpenFlow: Enabling Innovation in Campus Networks," ACM SIGCOMM Computer Communication Review, vol. 38, Issue 2, pp. 69-74 (2008).

Razavi, "Verizon to Demonstrate Software Defined Networking Principles With Collaborative Lab Trials," accessed at http://web.archive.org/web/20130127025834/http://bizcloudnetwork.com/verizon-openflow, Apr. 17, 2012, pp. 1-3.

Song, D., et al., "Timing Analysis of Keystrokes and Timing Attacks on SSH," Proceedings of the 10th Conference on USENIX Security Symposium, vol. 10, pp. 16 (2001).

Tootoonchian, A., and Ganjali, Y., "HyperFlow: A Distributed Control Plane for OpenFlow," Proceedings of the 2010 Internet Network Management Conference on Research on Enterprise Networking, pp. 1-6, USENIX Association (2010).

Vardi, Y., "Network Tomography: Estimating Source-Destination Traffic Intensities from Link Data," Journal of the American Statistical Association, vol. 91, Issue 433, pp. 365-377 (1996).

Zhang, Z., "Improving the Accuracy of Boolean Tomography by Exploiting Path Congestion Degrees," IEEE Symposium on Computers and Communications (ISCC), pp. 725-731 (2012).

Zhang-Shen, R., "Valiant Load-Balancing in Backbone Networks," pp. 4, Feb. 6, 2006.

Zhang-Shen, R., and McKeown, N., "Designing a Predictable Internet Backbone with Valiant Load-Balancing," In Quality of Service—IWQoS, Hermann Meer and Nina Bhatti, eds., vol. 3552, pp. 178-192 (2005).

International Search Report with Written Opinion for International Application No. PCT/US2013/044614 filed on Jun. 6, 2013 and mailed on Dec. 20, 2013.

"PCAP," Accessed at http://web.archive.org/web/20140421213631/http://www.tcpdump.org/pcap3_man.html, accessed on May 28, 2014, pp. 10.

"Traceroute," Accessed at http://web.archive.org/web/20140226112811/https://en.wikipedia.org/wiki/Traceroute, accessed on May 28, 2014, pp. 12.

"What is Impacket?," Accessed at http://corelabs.coresecurity.com/index.php?module=Wiki&action=view&type=tool&name=Impacket, accessed on May 28, 2014, pp. 5.

Andreasson, O., "Iptables Tutorial 1.2.2," Accessed at http://web.archive.org/web/20140125085654/https://www.frozentux.net/iptables-tutorial/iptables-tutorial.html, accessed on May 28, 2014, pp. 261.

Covarrubias-Rodriguez, J.C. et al., "FLF4DoS. Dynamic DDoS Mitigation based on TTL field using fuzzy logic," 17th International Conference on Electronics, Communications and Computers, pp. 21 (2007).

Emanuele, J. and Olivier.Le, M., "OSPF Security Vulnerabilities Analysis," RPSEC Working Group, Nov. 2003, pp. 20.

Evans, J., "Day 20: Traceroute in 15 lines of code using Scapy," Accessed at http://web.archive.org/web/20140427025015/http://jvns.ca/blog/2013/10/31/day-20-scapy-and-traceroute/, Oct. 31, 2013, pp. 3.

Francois, P. and Bonaventure, O., "Avoiding Transient Loops During IGP Convergence in IP Networks," In INFOCOM 2005, 24th Annual Joint Conference of the IEEE Computer and Communications Societies, Proceedings IEEE, 1, pp. 237-247 (2005 ).

Francois, P. et al., "Disruption Free Topology Reconfiguration in OSPF Networks," In INFOCOM 2007. 26th IEEE International Conference on Computer Communications, IEEE, pp. 89-97, (2007).

(56) References Cited

OTHER PUBLICATIONS

Gill, V. et al., "The Generalized TTL Security Mechanism (GTSM)," Network Working Group, RFC3682, pp. 16 (2007).

Greenberg, A., et al., "VL2: a Scalable and Flexible Data Center Network," Communications of the ACM, vol. 54, No. 3, pp. 95-104 (2011).

Hengartner, U. et al., "Detection and Analysis of Routing Loops in Packet Traces," In Proceedings of the 2nd ACM SIGCOMM Workshop on Internet Measurment, pp. 107-112 (2002).

Steenbergen, R.A., "Traceroute," pp. 1-20 (2011).

Villamizar, C., "Ospf Optimized Multipath (ospf-omp)," Internet Engineering Task Force, pp. 1-34 (1999).

Wang, H. et al., "Defense Against Spoofed IP Traffic Using Hop-Count Filtering," IEEE/ACM Transactions on Networking, vol. 15, No. 1, Feb. 2007, pp. 40-53.

Bakshi, M., "FRANTIC: A Fast Reference-based Algorithm for Network Tomography vla Compressive Sensing," accessed at http://wn.com/network_tomography, accessed on May 29, 2013, pp. 2.

* cited by examiner

COMPUTER PROGRAM PRODUCT 900

SIGNAL BEARING MEDIUM 902

904 AT LEAST ONE OF

ONE OR MORE INSTRUCTIONS FOR DETECTING A FIRST CORE NETWORK ROUTE GENERATED BY A FIRST INSTANCE AND TRAVERSING A SENSITIVE PATH AT A FIRST TIME;

ONE OR MORE INSTRUCTIONS FOR DETECTING A SECOND CORE NETWORK ROUTE GENERATED BY A SECOND INSTANCE AND TRAVERSING ANOTHER PATH NOT INCLUDING THE SENSITIVE PATH AT A SECOND TIME AFTER THE FIRST TIME;

ONE OR MORE INSTRUCTIONS FOR DETECTING THAT A THIRD CORE NETWORK ROUTE TRAVERSES THE SENSITIVE PATH AT A THIRD TIME AFTER THE SECOND TIME; AND/OR

ONE OR MORE INSTRUCTIONS FOR DETERMINING WHETHER TO IMPLEMENT THE THIRD CORE NETWORK ROUTE BASED ON AT LEAST ONE CRITERIA.

| COMPUTER-READABLE MEDIUM 906 | RECORDABLE MEDIUM 908 | COMMUNICATIONS MEDIUM 910 |

FIG. 9

PREVENTING NETWORK TOMOGRAPHY IN SOFTWARE DEFINED DATACENTER NETWORKS

CROSS-REFERENCE TO RELATED APPLICATION

This application is the National Stage filing under 35 U.S.C. §371 of PCT Application Ser. No. PCT/US13/44614 filed on Jun. 6, 2013. The PCT application is hereby incorporated by reference in its entirety.

BACKGROUND

Unless otherwise indicated herein, the materials described in this section are not prior art to the claims in this application and are not admitted to be prior art by inclusion in this section.

Network tomography is the study of a network's internal characteristics using information derived from end point data. The term tomography may be used to link the field conceptually to other processes that infer the internal characteristics of an object from external observation (from endpoints). Numerical treatments of network tomography generally break a network down into a graph and assemble a matrix of relationships between traffic statistics at known sources and destinations and the inferred relationships with traffic or delay on various network links. Such systems typically infer router link data and network traffic from other participants and generally decompose a system into linearly independent components to subtract undesired signals from desired ones and infer the statistics of target flows. Use of network tomography in the evaluation of datacenter networks may be impractical thus far because a user cannot control what links their data follows.

Datacenters are increasingly moving toward using software-defined networking (SDN), where datacenter networks can be rapidly reconfigured to reduce maximum transit time while retaining network capacity and reliability. SDN also allows datacenter users to explicitly control their own data forwarding and network paths. While datacenters implementing SDN may see benefits, they may also become vulnerable to certain side-channel attacks, such as those based on network tomography techniques.

SUMMARY

The present disclosure generally describes techniques for preventing network tomography in software-defined datacenter networks.

According to some examples, a method is provided for preventing network tomography in a software-defined datacenter network. The method may include detecting a first core network route generated by a first instance and traversing a sensitive path at a first time, detecting a second core network route generated by a second instance and traversing another path not including the sensitive path at a second time after the first time, detecting that a third core network route traverses the sensitive path at a third time after the second time, and determining whether to implement the third core network route based on at least one criterion.

According to other examples, a software-defined network (SDN) module is provided for preventing network tomography in a software-defined datacenter network. The SDN module may include a route analyzer module and a processing module. The route analyzer module may be configured to detect a first core network route generated by a first instance and traversing a sensitive path at a first time, detect a second core network route generated by a second instance and traversing another path not including the sensitive path at a second time after the first time, and detect that a third core network route traverses the sensitive path at a third time after the second time. The processing module may be configured to determine whether to implement the third core network route based on at least one criterion.

According to further examples, a cloud-based datacenter is provided for preventing network tomography in a software-defined datacenter network. The datacenter may include at least one virtual machine (VM) operable to be executed on one or more physical machines and a datacenter controller. The datacenter controller may be configured to detect a first core network route generated by a first instance executing on the at least one VM and traversing a sensitive path at a first time, detect a second core network route generated by a second instance executing on the at least one VIM and traversing another path not including the sensitive path at a second time after the first time, detect that a third core network route traverses the sensitive path at a third time after the second time, and determine whether to implement the third core network route based on at least one criterion.

According to yet further examples, a computer readable medium may store instructions for preventing network tomography in a software-defined datacenter network. The instructions may include detecting a first core network route generated by a first instance and traversing a sensitive path at a first time, detecting a second core network route generated by a second instance and traversing another path not including the sensitive path at a second time after the first time, detecting that a third core network route traverses the sensitive path at a third time after the second time, and determining whether to implement the third core network route based on at least one criterion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 illustrates a block diagram of an example computer program product, all arranged in accordance with at least some embodiments described herein.

DETAILED DESCRIPTION

Figure 1:
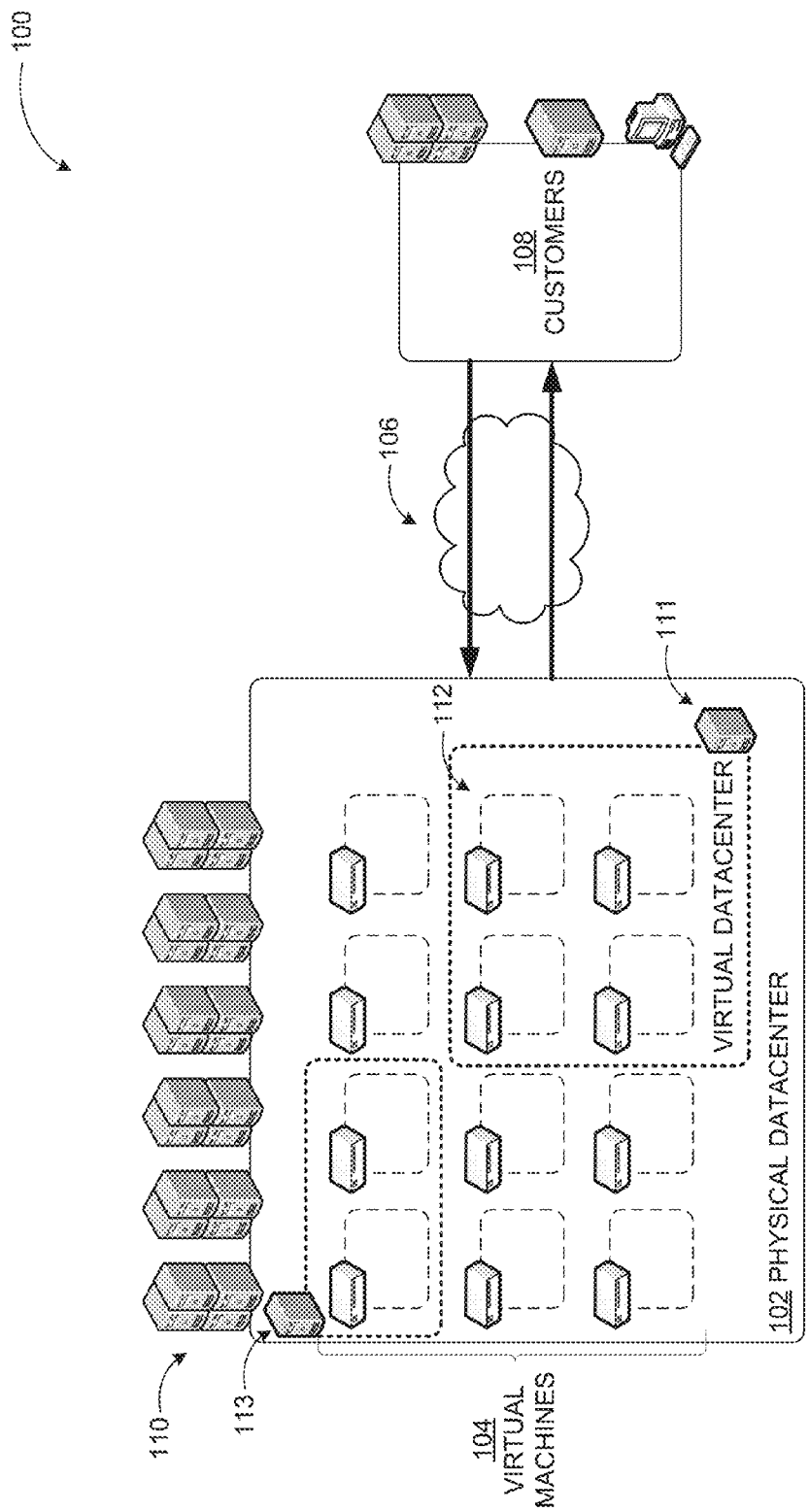
FIG. 1 illustrates an example datacenter-based system where prevention of network tomography in software-defined datacenter networks may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to preventing network tomography in software-defined datacenter networks.

Briefly stated, technologies are generally described for preventing abuse of software-defined datacenter networks. In some examples, an SDN abuse prevention module within a control layer of an SDN may use graph analysis rules and monitor network paths over time to detect and prevent abusive network conformation change command series. Instance-generated network paths may be analyzed to determine if the paths attempt to repeatedly traverse one or more sensitive network paths. If so, the paths may be implemented or denied based on, among other things, the time scale within which the paths attempt to repeatedly traverse the sensitive network paths.

FIG. 1 illustrates an example datacenter-based system where prevention of network tomography in software-defined datacenter networks may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

Figure 2:
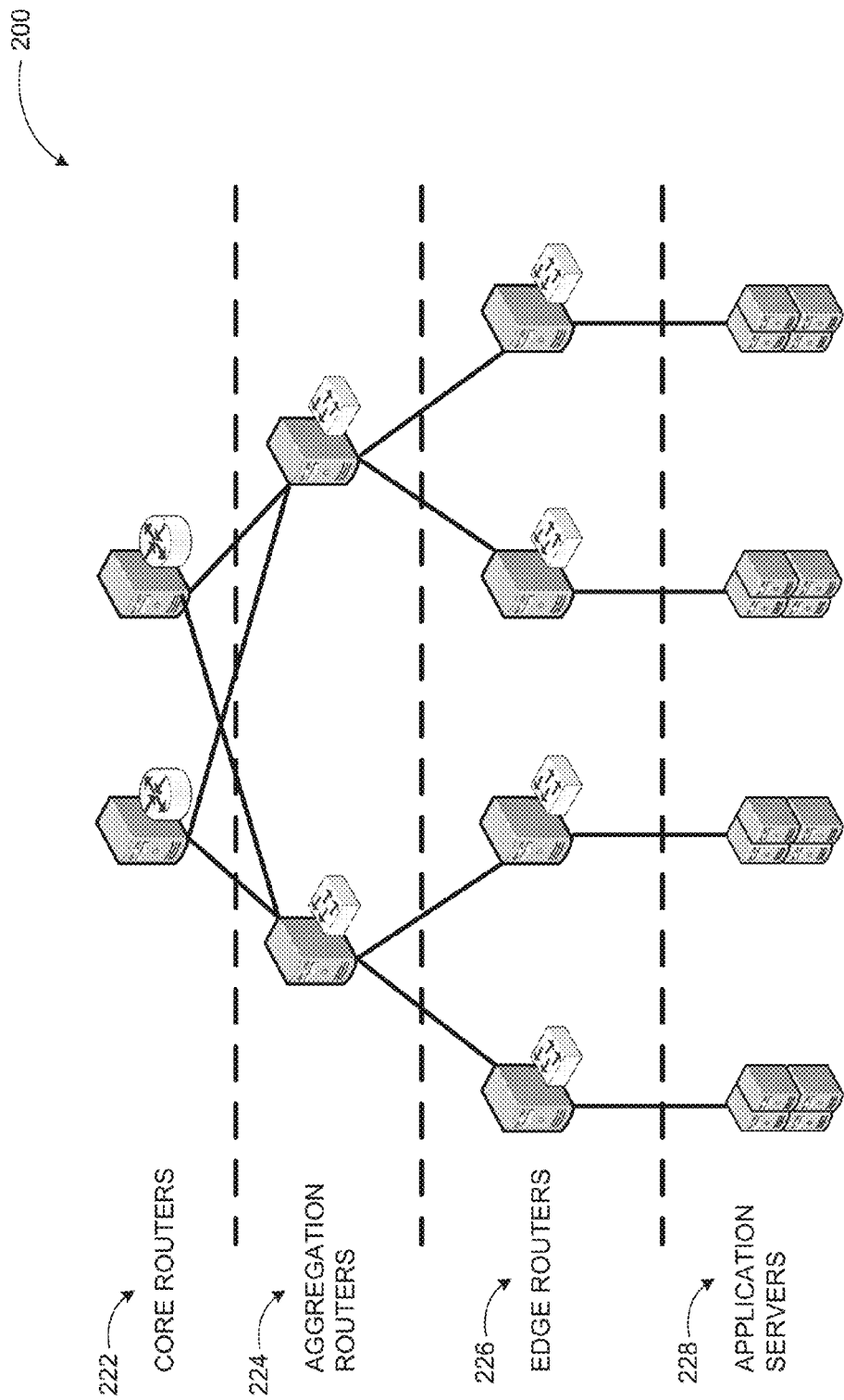
FIG. 2 illustrates a multi-layer network architecture where prevention of network tomography in software-defined datacenter networks may be implemented.

FIG. 2 illustrates a multi-layer network architecture where prevention of network tomography in software-defined datacenter networks may be implemented, arranged in accordance with at least some embodiments described herein.

As shown in a diagram 200, a datacenter (e.g., the physical datacenter 102 in FIG. 1) may include one or more layers of servers and/or routers, which may be arranged in a hierarchical fashion. The datacenter shown in the diagram 200 has three layers, although in other embodiments a datacenter may have more or fewer layers. The datacenter may include one or more application servers 228. In some embodiments, the application servers 228 may be configured to provide virtual machines (e.g., the virtual machines 104 described above in relation to FIG. 1) and/or run one or more customer applications. The datacenter may also include one or more edge routers 226 that reside in the first datacenter layer, each of which may couple to one or more of the application servers 228. The edge routers 226 in turn may couple to one or more aggregation routers 224, which may reside in a second layer of the datacenter. In some embodiments, each of the aggregation routers 224 may couple to two or more of the edge routers 226 and serve to combine or "aggregate" the network traffic from the connected edge routers. Finally, each of the aggregation routers 224 may couple to one or more core routers 222 in a third datacenter layer.

Figure 3:
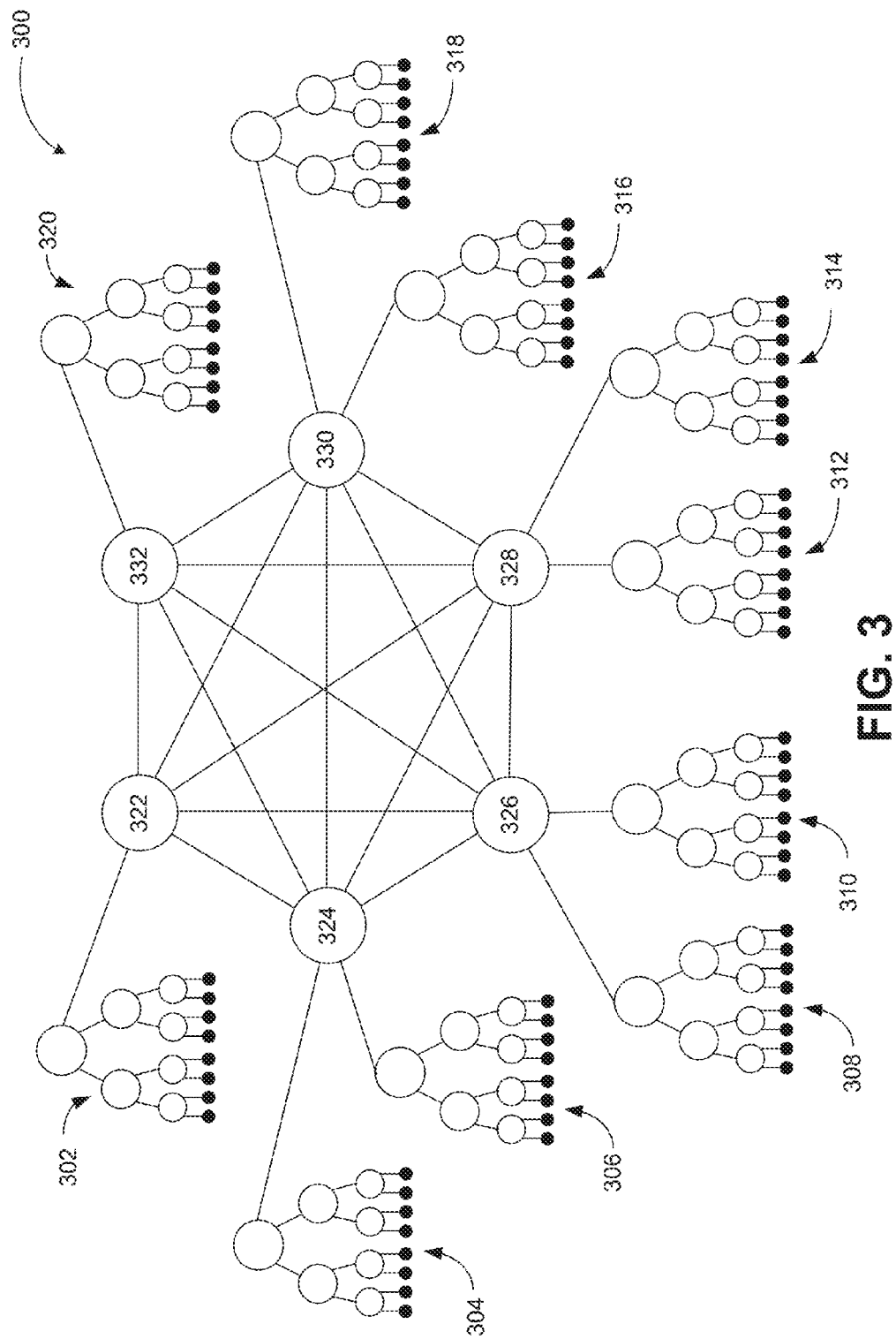
FIG. 3 illustrates a network architecture of core routers where prevention of network tomography may be implemented.

FIG. 3 illustrates a network architecture of core routers where prevention of network tomography may be implemented, arranged in accordance with at least some embodiments described herein.

As described above, a datacenter may include one or more layers of routers arranged in a hierarchical fashion, with one or more core routers (e.g., core routers 222) at the top of the hierarchy. In some embodiments, an individual core router may couple to one or more router networks including aggregation routers (e.g., the aggregation routers 224), edge routers (e.g., the edge routers 226), and/or application servers (e.g., the application servers 228). For example, as shown in a diagram 300, a core router 322 may couple to a server network 302, a core router 324 may couple to server networks 304 and 306, and a core router 326 may couple to server networks 308 and 310. Similarly, a core router 326 may couple to server networks 312 and 314, a core router 330 may couple to server networks 316 and 318, and a core router 332 may couple to a server network 320.

In some embodiments, each core router in a datacenter may also be coupled to every other core router (i.e., an "all-to-all" network configuration), and traffic from one core router to another may be split among outgoing connections from the source server and incoming connections to the destination server. For example, each of the core routers 322, 324, 326, 328, 330, and 332 may be coupled to every other core router, as depicted in the diagram 300. When the core router 322 sends data to the core router 324, the core router 322 may split the data into portions and transmit a portion to each of the core routers 324, 326, 328, 330, and 332. Subsequently, the core routers 326, 328, 330, and 332 may forward their portions to the destination core router 324. The various routers discussed herein may be implemented as special purpose equipment or general purpose equipment such as servers.

The "all-to-all" core router configuration described above may allow for high network traffic with high reliability, providing significant protection against link congestion and/or outages. However, this core router configuration may also increase the maximum data transit time between servers. For example, assuming that data transit time is proportional to the number of core routers the data passes through, the minimum data transit time from one core router (e.g., the core router 322) to another core router (e.g., the core router 324) may be the time it takes tier data to pass through the direct connection coupling the two routers. However, since in this core router configuration some data may have to go to another core router (e.g., the core routers 326, 328, 330, and 332) before arriving at the destination core router, the maximum data transit time may be double the minimum transit time.

As mentioned above, software-defined networking (SDN) may be used to dynamically and rapidly reprogram the core router network so as to reduce maximum data transit times while retaining at least some of the network capacity and reliability provided by the "all-to-all" core router configuration. When using SDN techniques, data traffic from one core router to another core router may not be split among all outgoing connections from the source server and all incoming connections to the destination server. Instead, some of the data may be transmitted along the direct connection between the source and destination servers. For example, if the core router 322 sends data to the core router 324, a substantial portion of that data may be transmitted through the direct connection coupling them together, instead of portions being transmitted to each of the other core routers. In some embodiments, SDN may allow a user to select particular routes in the core router network to be used for data transmission.

However, core router networks using SDN techniques may be vulnerable to side-channel attacks using network tomography. Network tomography uses network traffic information obtained from one or more network endpoints (e.g., source or destination servers) to derive information about the network itself. For example, the structure of a network may be determined by relating network traffic statistics at known network sources and destinations and inferred relationships with network traffic or delay on various network links. This may allow an attacker to (a) map a network to determine where target applications reside, (b) achieve co-location with target applications by allowing randomly-placed instances to detect how close they are to a target application, and (c) attack by extracting traffic information from target applications. In general, the "all-to-all" network configuration described above may not be vulnerable to network tomography, because in the "all-to-all" configuration network traffic is distributed across available links. Therefore, network tomography, which uses network traffic to infer network structure, may not be able to extract sufficient information to infer the network structure of an "all-to-all" network. In contrast, networks using SDN techniques may consolidate traffic into several optimal paths, thus making them vulnerable to network tomography. "Instance" as used herein, may refer to an application, a deployment, a user/customer, or even multiple users who may be suspected to be working in concert, for example, by datacenter staff or intrusion detection systems.

Figure 4:
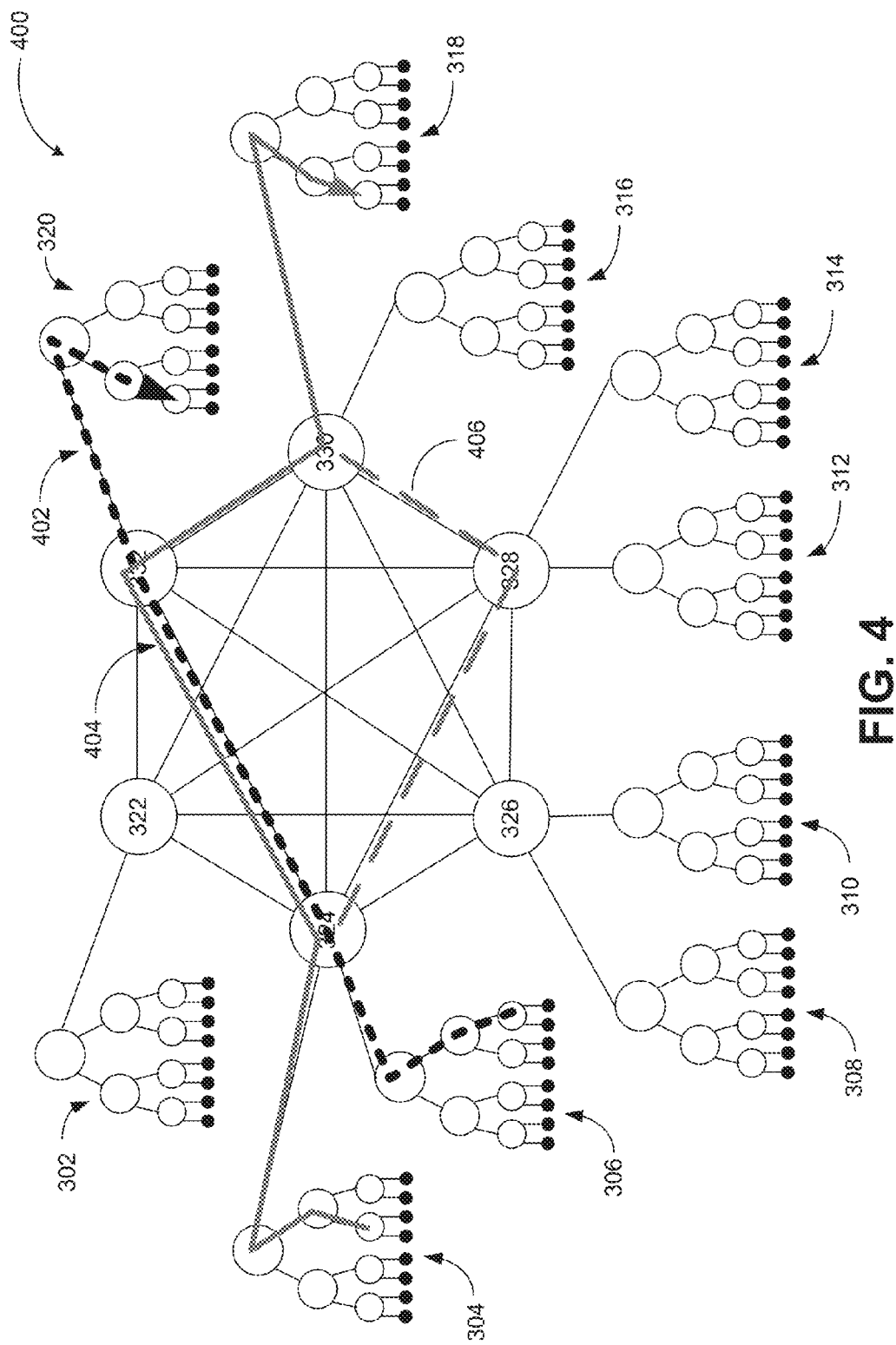
FIG. 4 illustrates the use of network tomography in the network architecture of FIG. 3.

FIG. 4 illustrates the use of network tomography in the network architecture of FIG. 3, arranged in accordance with at least some embodiments described herein.

As shown in a diagram 400, a target service or application may include instances or virtual machines located at the server network 306 and the server network 320. The target service may transfer data between the instances via a core traffic flow 402 (shown as the darker, dotted line) that begins at the server network 306, passes through the core routers 324 and 332, and ends at the server network 320. If the core network allows SDN, an attacker with instances at the server networks may be able to select particular paths in the core router network to route data along in order to probe traffic and extract information about the flow 402. For example, the attacker may have a source instance located at the server network 304 and a destination instance located at the server network 318. The attacker may then select a path 404 (from the server network 304 to the server network 318 via the core routers 324, 332, and 330) and a path 406 (from the server network 304 to the server network 318 via the core routers 324, 328, and 330) for data transmission between the instances. By switching network traffic between or sampling the two paths 404 and 406, the attacker may be able to use statistical techniques to find and extract information about the flow 402, such as the location of the target service/application. In some embodiments, the attacker may use permutations of different paths and switching patterns along with specifically-timed requests to the target service/application to locate the target service/application. Once at least one end of the flow 402 (e.g., either the server network 306 or the server network 320) has been identified, the attacker may then co-locate at least one instance at the identified location and continue the network tomography attack, as described below in FIG. 5.

Figure 5:
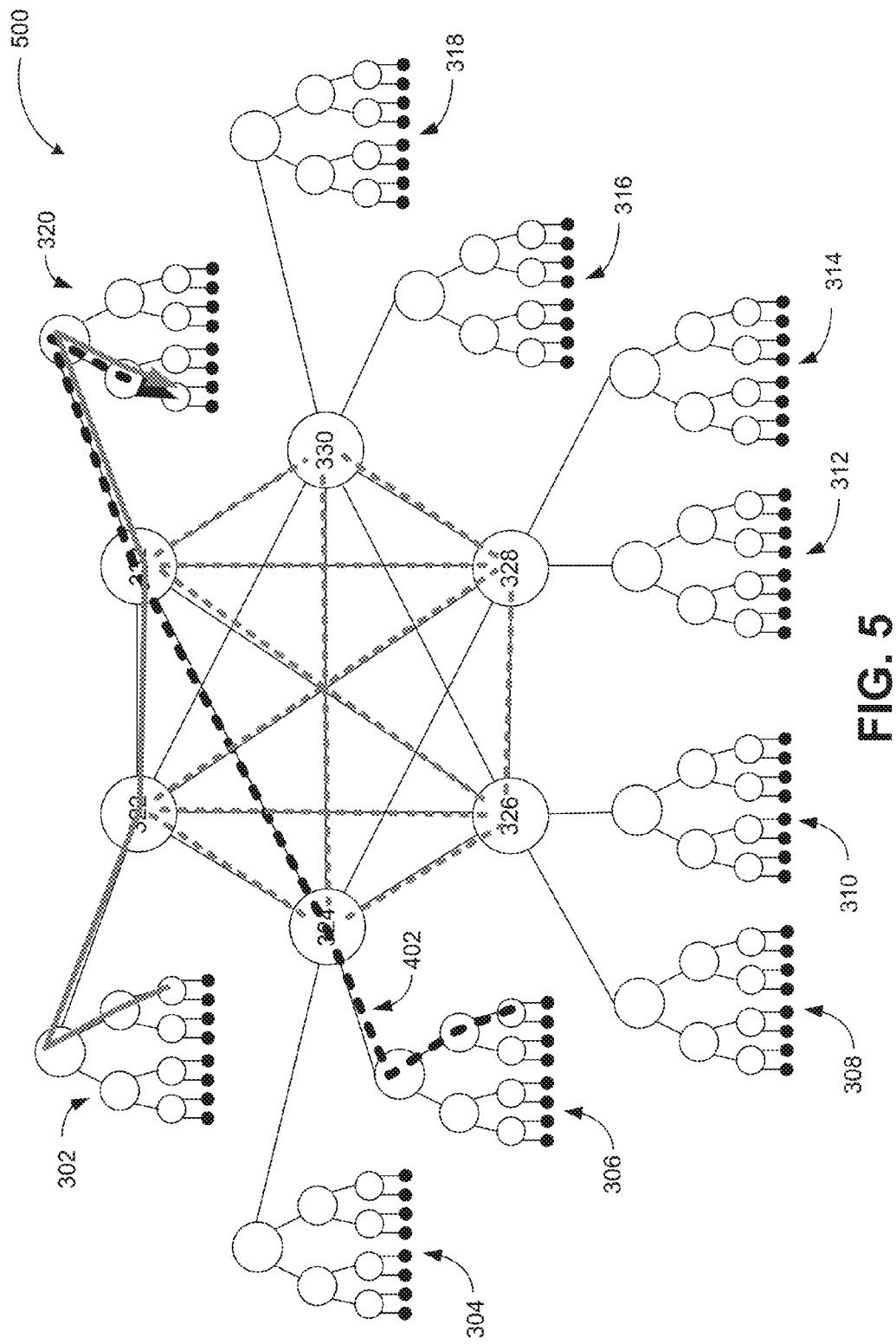
FIG. 5 illustrates the use of network tomography and co-location in the network architecture of FIG. 3.

FIG. 5 illustrates the use of network tomography and co-location in the network architecture of FIG. 3, arranged in accordance with at least some embodiments described herein.

As shown in a diagram 500, similar to the diagram 400 in FIG. 4, once an attacker has identified one end of the flow 402, the attacker may co-locate an instance at the identified location. For example, if the server network 320 is identified as one end of the flow 402, the attacker may co-locate a destination instance there. In some embodiments, the attacker may also re-locate a source instance to the server network 302.

Subsequently, the attacker may route traffic from the source instance at the server network 302 to the destination instance co-located with the identified target location at the server network 320 using multiple paths in order to gather information about the flow 402. For example, traffic from the source instance and to the destination instance needs to pass through the core routers 322 and 332, because those are the core routers connected to the server networks containing the source and destination instances. However, the attacker may route traffic directly between the core routers 322 and 332 (as shown by the solid gray line connecting the core routers 322 and 332), or may route traffic between the core routers 322 and 332 via one or more other core router (as shown by the dashed gray lines). For example, traffic may be routed between the core routers 322 and 332 via one other core router (e.g., one of the core routers 324, 326, 328, and 330), two other core routers, three other core routers, or even all of the other core routers. This flexibility in traffic route control provided by SDN may allow the attacker to sample traffic in the entire core router network and differentiate data belonging to the target flow 402 from other data. The attacker may then be able to locate the other end of the flow 402 and perform further network tomography and/or side-channel attacks.

Figure 6:
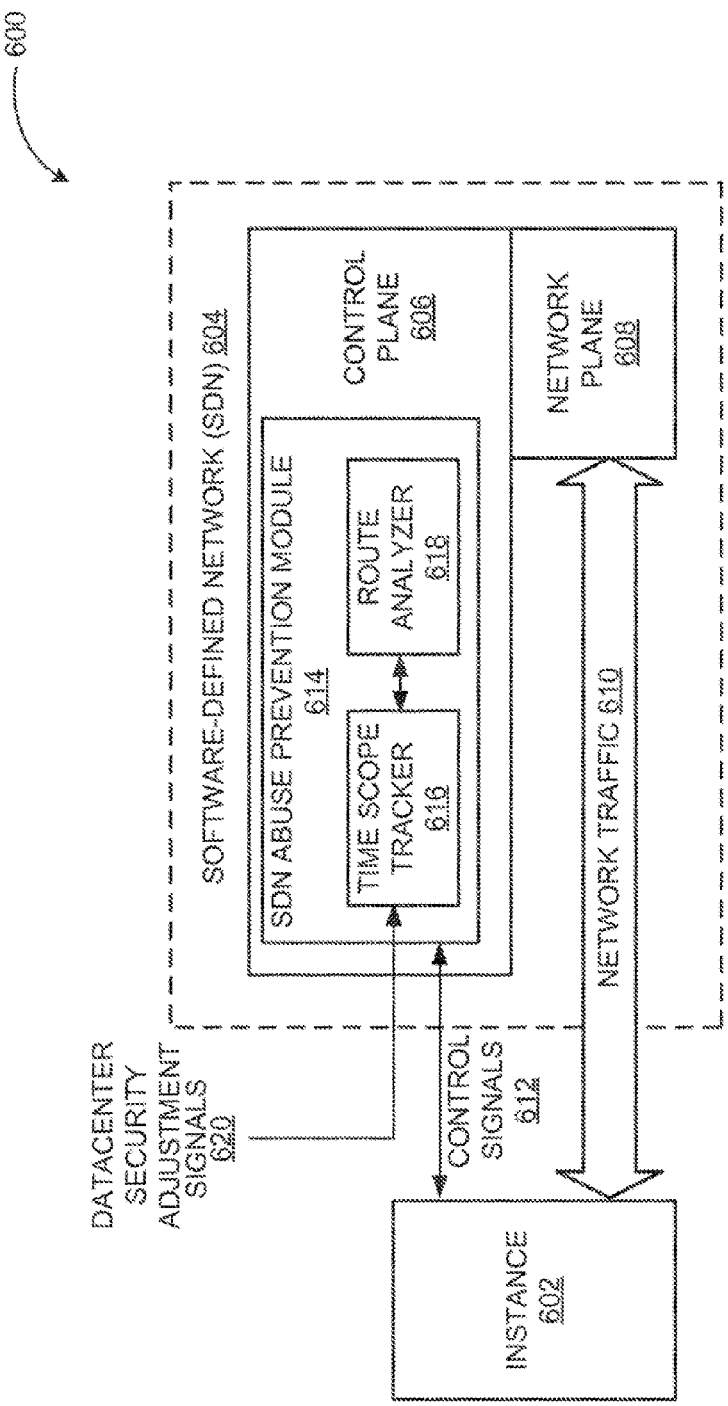
FIG. 6 illustrates a system with a software-defined network (SDN) module for preventing network tomography in software-defined datacenter networks.

FIG. 6 illustrates a system with a software-defined network (SDN) module for preventing network tomography in software-defined datacenter networks, arranged in accordance with at least some embodiments described herein.

According to a diagram 600, a software-defined network (SDN) 604 may include a control plane 606 and a network plane 608. The network plane 608 may include the connections between individual servers or physical machines (e.g., the direct connections between the core routers 322, 324, 326, 328, 330, and 332 in FIGS. 3, 4, and 5). The control plane 606 may manage the network plane 608 to route data along particular paths in the network plane 608. For example, referring to FIG. 4, the control plane 606 may be configured to direct data along the flow 402, the path 404, and/or the path 406. In some embodiments, an instance or virtual machine 602 may send and/or receive network traffic 610 via the network plane 608. The instance 602 may also provide control signals 612 to the control plane 606 in order to select particular paths in the network plane 608 for the network traffic 610 to travel.

In some embodiments, the SDN 604 (and in the illustrated example, the control plane 606) may include an SDN abuse prevention module 614 configured to detect and prevent side-channel attacks based on network tomography as described above in FIGS. 4 and 5. In general, side-channel attacks based on network tomography may be successful when an attacker can select particular paths in the network plane 608 to probe and repeatedly probe the selected paths over time to gather traffic statistics. For example, referring to FIG. 5, an attacker wishing to perform an attack based on network tomography may select target paths leading to the identified target location at the server network 320 and non-target paths (e.g., paths to other core routers/server networks). The attacker may repeatedly probe the target paths over time to gather traffic data including traffic to the target and non-target traffic. The attacker may also repeatedly probe the non-target paths over time to gather traffic data only including non-target traffic. The attacker may then use the gathered traffic data to isolate traffic to the target.

Attacks based on network tomography may be defeated by preventing the explicit selection of desired network paths by a user, preventing a user from repeatedly probing selected network paths, or a combination of the two. As such, the SDN abuse prevention module 614 may include a route analyzer 618. The route analyzer 618 may be configured to evaluate paths in the network plane 608 selected to carry traffic associated with the instance 602. For example, the route analyzer 618 may determine if a particular network path includes one or more sensitive paths. In response to determination that a particular network path includes one or more sensitive paths, the SDN abuse prevention module 614 may determine whether to allow the instance 602 to use the selected network path based on one or more criteria. For example, the SDN abuse prevention module 614 may allow the instance 602 to use the selected network path with particular time constraints, as further described below.

In some embodiments, the criteria may include whether a particular path was selected by the instance 602 (e.g., via the control signals 612) or by another source. Since network tomography probes occur on network paths specifically selected by an instance, a network path that includes a sensitive path but was not specifically selected by an instance may not be indicative of a network tomography probe. Therefore, if the SDN abuse prevention module 614 determines that the path was selected by the instance 602, it may prevent the instance 602 from using that path. On the other hand, if the path was selected by another source such as the datacenter itself, then the SDN abuse prevention module 614 may allow the instance 602 to use the path. In some embodiments, depending on how the path was selected, the SDN abuse prevention module 614 may prevent information about the path (e.g., route timing information, route path, or any other suitable information) from being reported to the instance 602.

The determination of what network paths are categorized as sensitive paths may be based on, for example, an identity or security level of the users of the network. In some embodiments, network paths may be categorized as sensitive paths only for particular instances. For example, a network path connecting two instances owned by a particular user may not be considered sensitive for that particular user, but may be considered sensitive for another user. A user may also be able to have their connection paths designated "sensitive" by paying for a higher security tier in the network. In some embodiments, certain network routes including sensitive paths may be made unavailable to particular users or instances, and the datacenter or the SDN abuse prevention module 614 may prevent those users or instances from using those unavailable network routes.

The SDN abuse prevention module 614 may also include a time scope tracker 616. As mentioned above, a successful attack based on network tomography may involve repeated probes of selected network paths over time. In some embodiments, an attacker may need to probe a particular selected network path with a particular frequency in order to gather useful traffic information. Put another way, the attacker may not be able to allow too much time to pass between successive probes of a particular network path, otherwise the gathered traffic data may not be statistically useful. The time scope tracker 616 may be configured to compute a time threshold for a particular sensitive path (as described above) based on the amount of traffic congestion in the network and/or the security level associated with the sensitive path. For example, the time threshold may be larger if the network is more congested and/or the sensitive path is associated with a higher security level, or vice-versa. The SDN abuse prevention module 614 may then use the time threshold to determine whether the instance 602 is allowed to use that sensitive path. For example, the SDN abuse prevention module 614 may prevent the instance 602 from repeatedly attempting to transmit or receive data on that sensitive path if the time between one attempt and the next attempt is less than the time threshold. On the other hand, the SDN abuse prevention module 614 may allow the instance 602 to use a sensitive path if the time between successive attempts to use that path is more than the time threshold for that path. In some embodiments, the time scope tracker 616 may also apply time thresholds to successive attempts to use different network paths. In some embodiments, the time scope tracker 616 may be adjusted by datacenter security adjustment signals 620 to security levels that may be instance- or datacenter zone-specific.

While the operation of the SDN abuse prevention module 614 is described above with respect to the single instance 602, the SDN abuse prevention module 614 may also be configured to operate over multiple instances. For example, a single user (or several users) may own multiple instances on the same network, and may distribute network tomography probing across the multiple instances. In this case, the SDN abuse prevention module 614 may be able to detect and prevent network tomography attempts across the multiple instances. In some embodiments, the SDN abuse prevention module 614 may be able to impede multi-instance network tomography attempts by perturbing the absolute values of reported network timing data for different users. For example, one user may receive true network timing data, whereas other users may receive network timing data that is offset by variable amounts (constant for each user but different for different users), thus foiling attempts to cross-reference network timing data across users.

Figure 7:
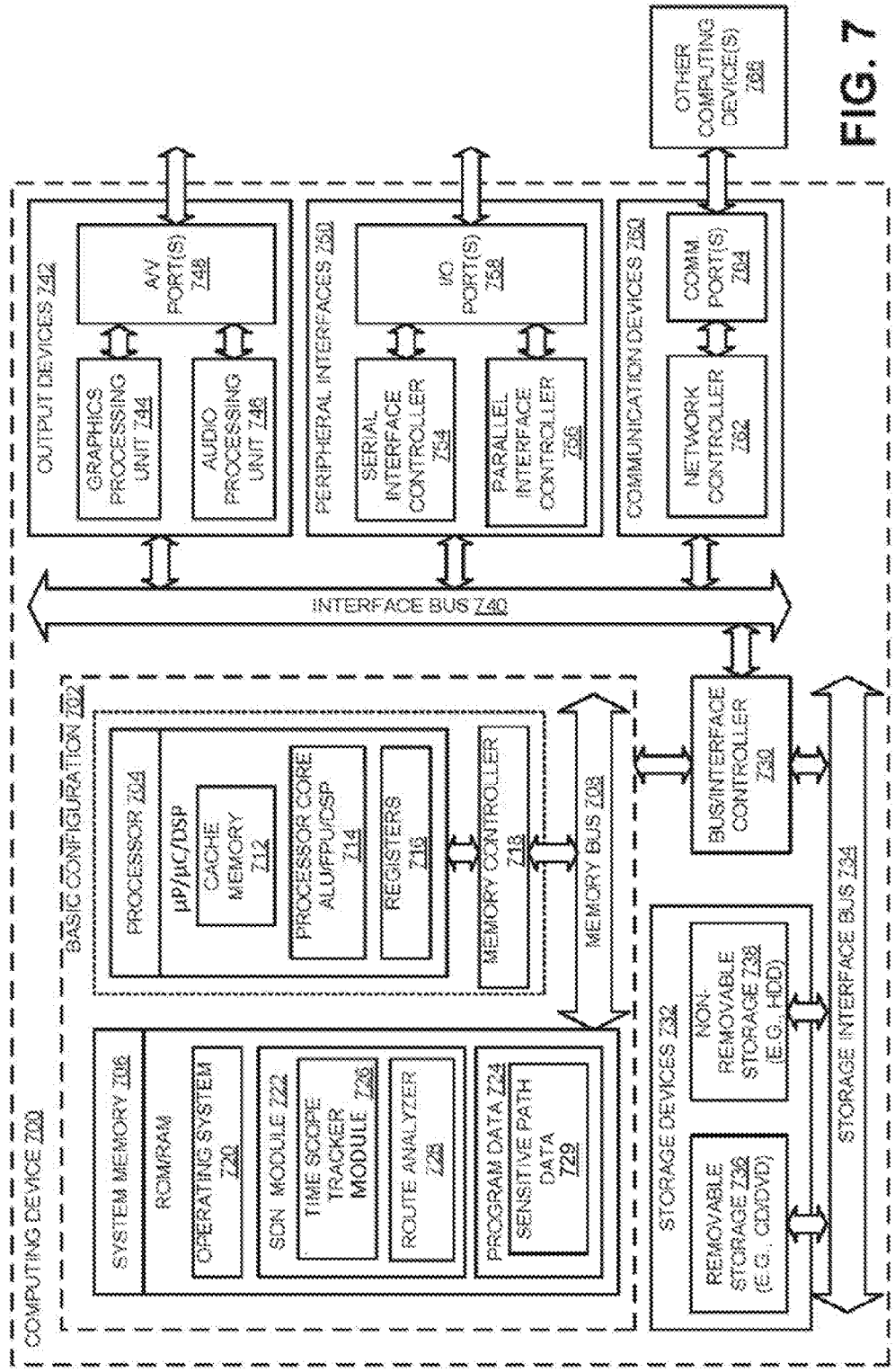
FIG. 7 illustrates a general purpose computing device, which may be used to prevent network tomography in software-defined datacenter networks.

FIG. 7 illustrates a general purpose computing device, which may be used to prevent network tomography in software-defined datacenter networks, arranged in accordance with at least some embodiments described herein.

For example, the computing device 700 may be used to prevent network tomography in software-defined datacenter networks as described herein. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a software-defined network (SDN) module 722, and program data 724. The SDN module 722 may include a time scope tracker module 726 and a route analyzer 728 for preventing network tomography in software-defined datacenter networks as described herein. The program data 724 may include, among other data, sensitive path data 729 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 750, and one or more communication devices 760) to the basic configuration 702 via the bus/interface controller 730. Some of the example output devices 742 include a graphics processing unit 744 and an audio processing unit 746, which may be configured to communicate to various external devices such as a display or speakers via one or more A/V ports 748. One or more example peripheral interfaces 750 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 760 includes a network controller 762, which may be arranged to facilitate communications with one or more other computing devices 766 over a network communication link via one or more communication ports 764. The one or more other computing devices 766 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods for preventing network tomography in software-defined datacenter networks. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 8:
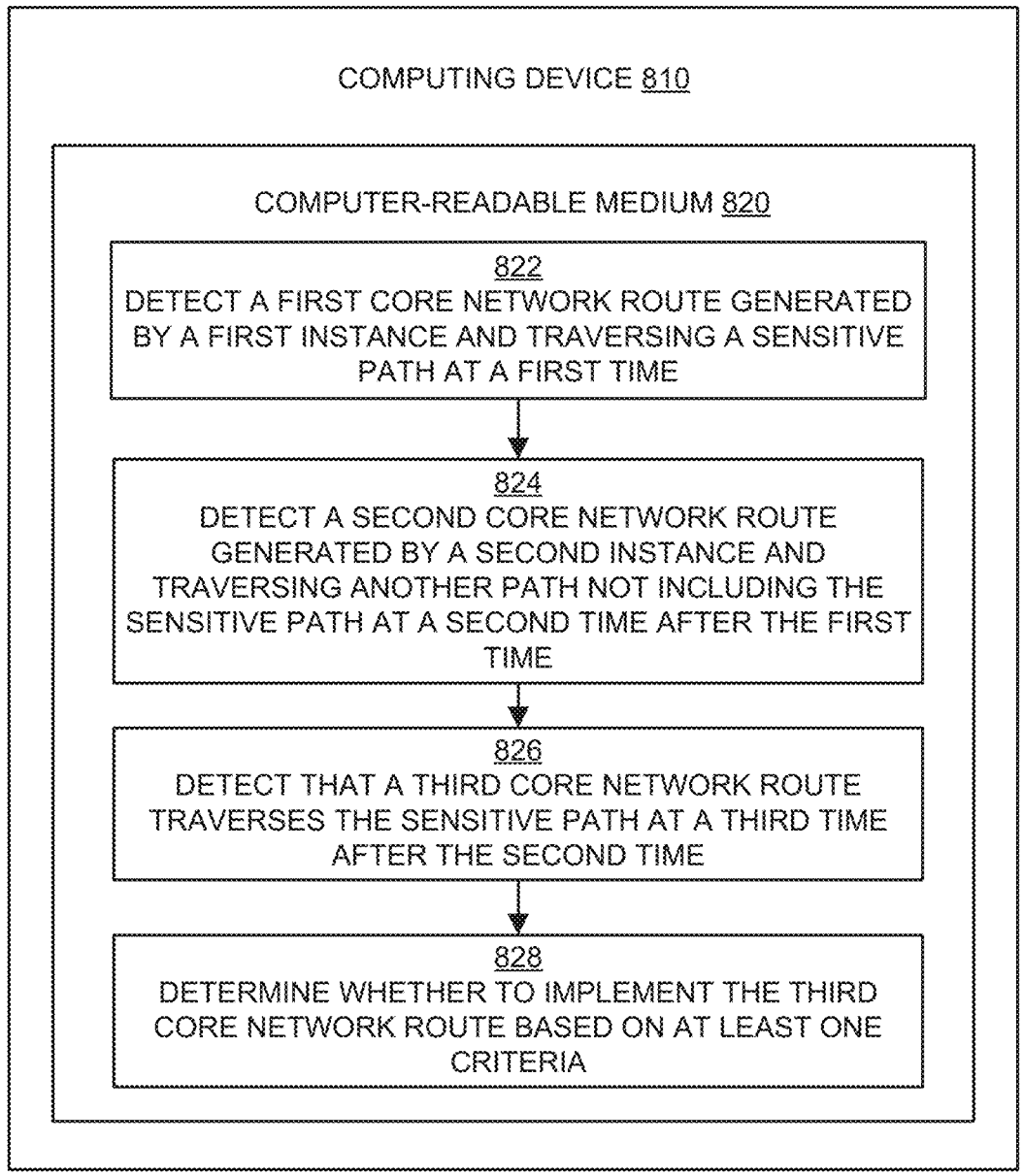
FIG. 8 is a flow diagram illustrating an example method for preventing network tomography in software-defined datacenter networks that may be performed by a computing device such as the computing device in FIG. 7.

FIG. 8 is a flow diagram illustrating an example method for preventing network tomography in software-defined datacenter networks that may be performed by a computing device such as the computing device in FIG. 7, arranged in accordance with at least some embodiments described herein.

Example methods may include one or more operations, functions or actions as illustrated by one or more of blocks 822, 824, 826, and/or 828, and may in some embodiments be performed by a computing device such as the computing device 700 in FIG. 7. The operations described in the blocks 822-828 may also be stored as computer-executable instructions in a computer-readable medium such as a computer-readable medium 820 of a computing device 810.

An example process for preventing network tomography in software-defined datacenter networks may begin with block 822, "DETECT A FIRST CORE NETWORK ROUTE GENERATED BY A FIRST INSTANCE AND TRAVERSING A SENSITIVE PATH AT A FIRST TIME", where a software-defined network (SDN) module (e.g., the SDN abuse prevention module 614) may detect a first core network route generated by a first instance (e.g., the instance 602) and traversing a sensitive path at a first time. For example, referring to FIG. 4, the sensitive path may be the connection between the core router 324 and the core router 332 traversed by the flow 402, and the first core network route may be the path 404. The SDN module may be configured to determine that the first core network route traverses the sensitive path using a route analyzer (e.g., the route analyzer 618).

Block 822 may be followed by block 824, "DETECT A SECOND CORE NETWORK ROUTE GENERATED BY A SECOND INSTANCE AND TRAVERSING ANOTHER PATH NOT INCLUDING THE SENSITIVE PATH AT A SECOND TIME AFTER THE FIRST TIME", where the SDN module may detect a second core network route that (a) traverses a path that does not include the sensitive path and (b) traverses the path at a second time after the first time. The second core network route may be generated by a second instance different from the first instance, or may be generated by the first instance. For example, again referring to FIG. 4, the second core network route may be the path 406, which does not include the sensitive path between the core router 324 and the core router 332.

Block 824 may be followed by block 826, "DETECT THAT A THIRD CORE NETWORK ROUTE TRAVERSES THE SENSITIVE PATH AT A THIRD TIME AFTER THE SECOND TIME", where the SDN module may detect a third core network route that includes the sensitive path after the second time. The third core network route may be generated by the first instance, the second instance, or yet another instance, and in some embodiments may be the same as the first core network route. For example, yet again referring to FIG. 4, the third core network route may be path 404. In other embodiments, the third core network route may only be similar to the first core network route in that the sensitive path is traversed in both.

Finally, block 826 may be followed by block 828, "DETERMINE WHETHER TO IMPLEMENT THE THIRD CORE NETWORK ROUTE BASED ON AT LEAST ONE CRITERIA", where the SDN module may determine whether the third core network route should be implemented based on one or more criteria. For example, the SDN module may use a time scope tracker module (e.g., the time scope tracker 616) to determine if sufficient time has elapsed since the first time to allow the third core network route, as described above in reference to FIG. 6.

FIG. 9 illustrates a block diagram of an example computer program product, arranged in accordance with at least some embodiments described herein.

In some examples, as shown in FIG. 9, the computer program product 900 may include a signal bearing medium 902 that may also include one or more machine readable instructions 904 that, when executed by, for example, a processor, may provide the functionality described herein. Thus, for example, referring to the processor 704 in FIG. 7, the SDN module 722 may undertake one or more of the tasks shown in FIG. 9 in response to the instructions 904 conveyed to the processor 704 by the signal bearing medium 902 to perform actions associated with preventing network tomography in software-defined datacenter networks as described herein. Some of those instructions may include, for example, detecting a first core network route generated by a first instance and traversing a sensitive path at a first time, detecting a second core network route generated by a second instance and traversing another path not including the sensitive path at a second time after the first time, detecting that a third core network route traverses the sensitive path at a third time after the second time, and/or determining whether to implement the third core network route based on at least one criteria, according to some embodiments described herein.

In some implementations, the signal bearing medium 902 depicted in FIG. 9 may encompass a computer-readable medium 906, such as, but not limited to, a hard disk drive, a solid state drive, a Compact Disc (CD), a Digital Versatile Disk (DVD), a digital tape, memory, etc. In some implementations, the signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the computer program product 900 may be conveyed to one or more modules of the processor 904 by an RF signal bearing medium, where the signal bearing medium 902 is conveyed by the wireless communications medium 910 (e.g., a wireless communications medium conforming with the IEEE 802.11 standard).

According to some examples, a method for preventing network tomography in a software-defined datacenter network may include detecting a first core network route generated by a first instance and traversing a sensitive path at a first time, detecting a second core network route generated by a second instance and traversing another path not including the sensitive path at a second time after the first time, detecting that a third core network route traverses the sensitive path at a third time after the second time, and determining whether to implement the third core network route based on at least one criterion.

According to some embodiments, the method may further include refraining from implementing the third core network route in response to determination that a source of the third network route is a third instance, where the at least one criterion includes the source. The method may further include implementing the third core network route in response to determination that the source is the datacenter and/or refraining from reporting information about the third core network route to a user of the datacenter network if the source is the datacenter. The information about the third core network route may include route timing information and/or route path. The first instance, the second instance, and the third instance may be associated with a single user.

According to other embodiments, the method may further include refraining from implementing the third core network route if the third core network route corresponds to an unavailable network route. The method may further include determining a first time duration between the first time and the second time, a second time duration between the second time and the third time, and/or a third time duration between the first time and the third time, determining whether a time threshold included in the at least one criterion is exceeded by the first time duration, the second time duration, and/or the third time duration, and in response to determination that the time threshold is exceeded, implementing the third core network route. The time threshold may be determined based on a security level of the sensitive path and a network congestion level.

According to further embodiments, the sensitive path may be determined based on an identity and/or a security level of one or more users of the datacenter network. The method may further include reporting a first absolute network delivery time perturbed by a first amount to the first instance and reporting a second absolute network delivery time perturbed by a second amount different from the first amount to the second instance.

According to other examples, software-defined network (SDN) module may be executed on one or more servers for preventing network tomography in a software-defined datacenter network. The SDN module may include a route analyzer module and a processing module. The route analyzer modules may be configured to detect a first core network route generated by a first instance and traversing a sensitive path at a first time, detect a second core network route generated by a second instance and traversing another path not including the sensitive path at a second time after the first time, and detect that a third core network route traverses the sensitive path at a third time after the second time. The processing module may be configured to determine whether to implement the third core network route based on at least one criterion.

According to some embodiments, the at least one criterion may include a source of the third core network route, and the processing module may be further configured to refrain from implementing the third core network route in response to determination that the source of the third network route is a third instance. The processing module may be further configured to implement the third core network route in response to determination that the source is the datacenter and/or refrain from reporting information about the third core network route to a user of the datacenter network if the source is the datacenter. The information about the third core network route may include route timing information and/or route path. The first instance, the second instance, and the third instance may be associated with a single user.

According to other embodiments, the at least one criterion may include whether the third core network route corresponds to an unavailable network route, and the processing module may be further configured to refrain from implementing the third core network route if the third core network route corresponds to the unavailable network route. The at least one criterion may include at least one time threshold, and the processing module may be further configured to determine a first time duration between the first time and the second time, a second time duration between the second time and the third time, and/or a third time duration between the first time and the third time, determine whether the at least one time threshold is exceeded by the first time duration, the second time duration, and/or the third time duration, and in response to determination that the at least one time threshold is exceeded, implement the third core network route. The at least one time threshold may be determined based on a security level of the sensitive path and a network congestion level.

According to further embodiments, the sensitive path may be determined based on an identity and/or a security level of one or more users of the datacenter network. The processing module may be further configured to report a first absolute network delivery time perturbed by a first amount to the first instance and report a second absolute network delivery time perturbed by a second amount different from the first amount to the second instance.

According to further examples, a cloud-based datacenter may be configured to prevent network tomography in a software-defined datacenter network. The datacenter may include at least one virtual machine (VM) operable to be executed on one or more physical machines and a datacenter controller. The datacenter controller may be configured to detect a first core network route generated by a first instance executing on the at least one VM and traversing a sensitive path at a first time, detect a second core network route generated by a second instance executing on the at least one VM and traversing another path not including the sensitive path at a second time after the first time, detect that a third core network route traverses the sensitive path at a third time after the second time, and determine whether to implement the third core network route based on at least one criterion.

According to some embodiments, the at least one criterion may include a source of the third core network route, and the controller may be further configured to refrain from implementing the third core network route in response to determination that the source of the third network route is a third instance. The controller may be further configured to implement the third core network route in response to determination that the source is the datacenter and/or refrain from reporting information about the third core network route to a user of the datacenter network if the source is the datacenter. The information about the third core network route may include route timing information and/or route path. The first instance, the second instance, and the third instance may be associated with a single user.

According to other embodiments, the at least one criterion may include whether the third core network route corresponds to an unavailable network route, and the controller may be further configured to refrain from implementing the third core network route if the third core network route corresponds to the unavailable network route. The at least one criterion may include a time threshold, and the controller may be further configured to determine a first time duration between the first time and the second time, a second time duration between the second time and the third time, and/or a third time duration between the first time and the third time, determine whether the time threshold is exceeded by the first time duration, the second time duration, and/or the third time duration, and in response to determination that the time threshold is exceeded, implement the third core network route. The time threshold may be determined based on a security level of the sensitive path and a network congestion level.

According to further embodiments, the sensitive path may be determined based on an identity and/or a security level of one or more users of the datacenter network. The controller may be further configured to report a first absolute network delivery time perturbed by a first amount to the first instance and report a second absolute network delivery time perturbed by a second amount different from the first amount to the second instance.

According to yet further examples, a computer-readable storage medium may store instructions which when executed on one or more computing devices execute a method for preventing network tomography in a software-defined datacenter network. The instructions may include detecting a first core network route generated by a first instance and traversing a sensitive path at a first time, detecting a second core network route generated by a second instance and traversing another path not including the sensitive path at a second time after the first time, detecting that a third core network route traverses the sensitive path at a third time after the second time, and determining whether to implement the third core network route based on at least one criterion.

According to some embodiments, the instructions may further include refraining from implementing the third core network route in response to determination that a source of the third network route is a third instance, where the at least one criterion includes the source. The instructions may further include implementing the third core network route in response to determination that the source is the datacenter and/or refraining from reporting information about the third core network route to a user of the datacenter network if the source is the datacenter. The information about the third core network route may include route timing information and/or route path. The first instance, the second instance, and the third instance may be associated with a single user.

According to other embodiments, the instructions may further include refraining from implementing the third core network route if the third core network route corresponds to an unavailable network route. The instructions may further include determining a first time duration between the first time and the second time, a second time duration between the second time and the third time, and/or a third time duration between the first time and the third time, determining whether a time threshold included in the at least one criterion is exceeded by the first time duration, the second time duration, and/or the third time duration, and in response to determination that the time threshold is exceeded, implementing the third core network route. The time threshold may be determined based on a security level of the sensitive path and a network congestion level.

According to further embodiments, the sensitive path may be determined based on an identity and/or a security level of one or more users of the datacenter network. The instructions may further include reporting a first absolute network delivery time perturbed by a first amount to the first instance and reporting a second absolute network delivery time perturbed by a second amount different from the first amount to the second instance.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors e.g., as one or more programs running on one or more microprocessors), as firmware, or as virtually any combination thereof and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being on associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicit recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 0.4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to prevent network tomography in a software-defined datacenter network, the method comprising:
   computing a time threshold for a sensitive path based on at least one of an amount of traffic congestion in the software-defined datacenter network and a security level associated with the sensitive path, wherein the sensitive path is a path selected to carry traffic in the software-defined datacenter network based on at least one of an identity and a security level of a user of the software-defined datacenter network, and the time threshold for the sensitive path is a minimum time duration between one attempt to traverse the sensitive path and a next attempt to traverse the sensitive path;
   detecting a first core network route generated by a first instance and traversing the sensitive path at a first time;
   detecting a second core network route generated by a second instance and traversing another path not including the sensitive path at a second time after the first time;
   detecting that a third core network route traverses the sensitive path at a third time after the second time;
   determining a time duration between the first time and the third time;
   determining whether to implement the third core network route based on one or more criteria, the one or more criteria including at least whether the time duration between the first time and the third time exceeds the time threshold for the sensitive path;
   in response to a determination that the time duration between the first time and the third time is more than or equal to the time threshold for the sensitive path, implementing the third core network route; and
   in response to a determination that the time duration between the first time and the third time is less than the time threshold for the sensitive path, refraining from implementing the third core network route.

2. The method of claim 1, further comprising refraining from implementing the third core network route in response to determination that a source of the third core network route is a third instance, wherein the one or more criteria further include the source.

3. The method of claim 2, further comprising implementing the third core network route in response to determination that the source is the datacenter.

4. The method of claim 3, further comprising refraining from reporting information about the third core network route to a user of the software-defined datacenter network if the source is the datacenter.

5. The method of claim 4, wherein the information about the third core network route includes at least one of route timing information and route path.

6. The method of claim 2, wherein the first instance, the second instance, and the third instance are associated with a single user.

7. The Method of claim 1, further comprising refraining from implementing the third core network route if the third core network route corresponds to an unavailable network route.

8. A software-defined network (SDN) module executed on one or more servers to prevent network tomography in a software-defined datacenter network, the SDN module comprising:
   a route analyzer module configured to:
      detect a first core network route generated by a first instance and traversing a sensitive path at a first time, wherein the sensitive path is a path selected to carry traffic in the software-defined datacenter network based on at least one of an identity and a security level of a user of the software-defined datacenter network;
      detect a second core network route generated by a second instance and traversing another path not including the sensitive path at a second time after the first time; and
      detect that a third core network route traverses the sensitive path at a third time after the second time;
   a time scope tracker configured to:
      compute a time threshold for the sensitive path based on at least one of an amount of traffic congestion in the software-defined datacenter network and a security level associated with the sensitive path, wherein the time threshold for the sensitive path is a minimum time duration between one attempt to traverse the sensitive path and a next attempt to traverse the sensitive path; and
      determine at least one of a first time duration between the first time and the second time, a second time duration between the second time and the third time, and a third time duration between the first time and the third time; and
   a processing module configured to:
      determine whether to implement the third core network route based on one or more criteria, the one or more criteria including at least whether the third time duration between the first time and the third time exceeds the time threshold for the sensitive path;
      in response to a determination that the time duration between the first time and the third time is more than or equal to the time threshold for the sensitive path, implement the third core network route; and
      in response to a determination that the time duration between the first time and the third time is less than the time threshold for the sensitive path, refrain from implementing the third core network route.

9. The SDN module of claim 8, wherein the one or more criteria further include a source of the third core network route and the processing module is further configured to implement the third core network route in response to determination that the source is the datacenter.

10. The SDN module of claim 9, wherein the processing module is further configured to refrain from reporting information about the third core network route to a user of the datacenter network if the source is the datacenter.

11. The SDN module of claim 8, wherein the processing module is further configured to:
   report a first absolute network delivery time perturbed by a first amount to the first instance; and
   report a second absolute network delivery time perturbed by a second amount different from the first amount to the second instance.

12. A cloud-based datacenter configured to prevent network tomography in a software-defined datacenter network, the datacenter comprising:
   at least one virtual machine (VM) operable to be executed on one or more physical machines, and
   a datacenter controller configured to:
      compute a time threshold for a sensitive path based on at least one of an amount of traffic congestion in the software-defined datacenter network and a security level associated with the sensitive path, wherein the sensitive path is a path selected to carry traffic in the software-defined datacenter network based on at least one of an identity and a security level of a user of the software-defined datacenter network, and the time threshold for the sensitive path is a minimum time duration between one attempt to traverse the sensitive path and a next attempt to traverse the sensitive path;
      detect a first core network route generated by a first instance executing on the at least one VM and traversing a sensitive path at a first time;
      detect a second core network route generated by a second instance executing on the at least one VM and traversing another path not including the sensitive path at a second time after the first time;
      detect that a third core network route traverses the sensitive path at a third time after the second time;
      determine a time duration between the first time and the third time;
      determine whether to implement the third core network route based on one or more criteria, the one or more criteria including at least whether the time duration between the first time and the third time exceeds the time threshold for the sensitive path;
      in response to a determination that the time duration between the first time and the third time is more than or equal to the time threshold for the sensitive path, implement the third core network route; and
      in response to a determination that the time duration between the first time and the third time is less than the time threshold for the sensitive path, refrain from implementing the third core network route.

13. The datacenter of claim 12, wherein the one or more criteria further include a source of the third core network route, and the datacenter controller is further configured to refrain front implementing the third core network route in response to determination that the source is a third instance executing on the at least one VM.

14. The datacenter of claim 13, wherein the first instance, the second instance, and the third instance are associated with a single user.

15. The datacenter of claim 12, wherein the one or more criteria further include whether the third core network route corresponds to an unavailable network route, and the datacenter controller is further configured to refrain from implementing the third core network route if the third core network route corresponds to the unavailable network route.

16. The datacenter of claim 12, wherein the datacenter controller is further configured to:
   report a first absolute network delivery time perturbed by a first amount to the first instance; and
   report a second absolute network delivery time perturbed by a second amount different from the first amount to the second instance.

* * * * *

UNITED STATES PATENT AND TRADEMARK OFFICE
CERTIFICATE OF CORRECTION

PATENT NO. : 9,356,956 B2  
APPLICATION NO. : 14/356150  
DATED : May 31, 2016  
INVENTOR(S) : Kruglick Page 1 of 1

It is certified that error appears in the above-identified patent and that said Letters Patent is hereby corrected as shown below:

In the specification,

In Column 1, Line 9, delete "§371" and insert -- § 371 --, therefor.

In Column 2, Line 18, delete "VIM" and insert -- VM --, therefor.

In Column 4, Line 67, delete "takes tier" and insert -- takes for --, therefor.

In Column 5, Line 39, delete ""all-to-ail"" and insert -- "all-to-all" --, therefor.

In Column 13, Line 4, delete "other examples, software-defined" and insert -- other examples, a software-defined --, therefor.

In Column 15, Line 65, delete "e.g.," and insert -- (e.g., --, therefor.

In Column 17, Line 7, delete "being on" and insert -- being so --, therefor.

In Column 17, Line 45, delete "explicit" and insert -- explicitly --, therefor.

In Column 18, Line 21, delete "3, 0.4," and insert -- 3, 4, --, therefor.

In the claims,

In Column 19, Line 17, in Claim 7, delete "Method" and insert -- method --, therefor.

In Column 20, Line 59, in Claim 13, delete "front" and insert -- from --, therefor.

Signed and Sealed this  
Ninth Day of August, 2016

Michelle K. Lee  
*Director of the United States Patent and Trademark Office*